(12) United States Patent
Yeh (10) Patent No.: US 8,290,702 B2
(45) Date of Patent: Oct. 16, 2012

(54) METHOD FOR DISPLAYING A NAVIGATION MODE OF A NAVIGATION DEVICE

(75) Inventor: Hui-Hua Yeh, Taipei (TW)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 457 days.

(21) Appl. No.: 12/582,714

(22) Filed: Oct. 21, 2009

(65) Prior Publication Data

US 2010/0114477 A1 May 6, 2010

(30) Foreign Application Priority Data

Nov. 6, 2008 (TW) .............................. 97142844 A (51) Int. Cl.
*G01C 21/00* (2006.01)
(52) U.S. Cl. ........................................ 701/433; 701/431
(58) Field of Classification Search .................. 701/410, 701/431, 433, 455, 533
See application file for complete search history.

(56) References Cited

U.S. PATENT DOCUMENTS

| | | | | |
|---|---|---|---|---|
| 5,884,218 A * | 3/1999 | Nimura et al. ................ 701/428 |
| 6,125,326 A * | 9/2000 | Ohmura et al. ............... 701/454 |
| 6,144,318 A * | 11/2000 | Hayashi et al. .......... 340/995.19 |
| 6,334,090 B1 * | 12/2001 | Fujii ............................. 701/468 |
| 6,418,374 B2 * | 7/2002 | Sakamoto et al. ............ 701/410 |
| 6,710,774 B1 * | 3/2004 | Kawasaki et al. ............ 345/419 |
| 6,762,772 B1 * | 7/2004 | Imamura et al. ............. 715/700 |
| 6,836,728 B2 * | 12/2004 | Shimabara .................... 701/455 |
| 6,853,911 B1 * | 2/2005 | Sakarya ....................... 701/455 |
| 6,978,209 B2 * | 12/2005 | Nakahara et al. ............. 701/410 |
| 7,359,798 B2 * | 4/2008 | Nagamasa .................... 701/455 |
| 2001/0021894 A1 * | 9/2001 | Sakamoto et al. ............ 701/209 |
| 2004/0002303 A1 * | 1/2004 | Hirokawa .................... 455/11.1 |
| 2004/0048620 A1 * | 3/2004 | Nakahara et al. .......... 455/456.1 |
| 2006/0155465 A1 * | 7/2006 | Jung et al. .................... 701/209 |
| 2006/0227047 A1 * | 10/2006 | Rosenberg ............... 342/357.13 |
| 2008/0098068 A1 * | 4/2008 | Ebata ........................... 709/206 |
| 2009/0138200 A1 * | 5/2009 | Hunter et al. ................ 701/216 |
| 2010/0138154 A1 * | 6/2010 | Kon et al. .................... 701/212 |

* cited by examiner

*Primary Examiner* — Helal A Algahaim
(74) *Attorney, Agent, or Firm* — Winston Hsu; Scott Margo (57) ABSTRACT

After a navigation device performs navigation positioning, the moving speed of the navigation device and the distance between the position of the navigation device and a destination can be acquired. If the moving speed of the navigation device is slower than a predetermined speed and if the distance between the navigation device and the destination is smaller than a predetermined distance, the navigation device displays a pedestrian mode or a slow driving speed mode; otherwise the navigation device displays a normal driving speed mode.

1 Claim, 14 Drawing Sheets

METHOD FOR DISPLAYING A NAVIGATION MODE OF A NAVIGATION DEVICE

BACKGROUND OF THE INVENTION

1. Field of the Invention

The present invention related to a method for displaying a navigation mode of a navigation device, and more particularly, to a method for displaying a navigation mode of a navigation device based on the moving speed of the navigation device and the distance between the navigation device and a destination.

2. Description of the Prior Art

When a user turns on a navigation device, the navigation device automatically enters a normal driving speed mode. When the user is still far from a destination, the navigation device mainly displays route-planning information, instead of too many objects which may confuse the user. Therefore, the navigation device usually display a map covering a larger area based on a larger reduction scale (small scale map) in order to provide driving directions.

Sometimes the user may want to search for an object which is not shown in the small scale map, or may need to locate the destination more precisely after approaching the neighborhood. Under these circumstances, the user can manually adjust the display scale of the navigation device for displaying a large scale map showing more objects of a region, thereby assisting the user in identifying the target object.

However, it is dangerous and not advisable to adjust the display scale of the navigation device manually while driving. For safety reason, the user may need to pull over before manually adjusting the display scale of the navigation device, or may even get out of the car for searching the target. Either case may cause great inconvenience to the user.

SUMMARY OF THE INVENTION

The present invention provides a method for displaying a navigation mode of a navigation device comprising the navigation device performing navigation positioning; acquiring a moving speed of the navigation device; and displaying the navigation mode of the navigation device based on the moving speed of the navigation device.

The present invention further provides a method for displaying a navigation mode of a navigation device comprising the navigation device performing navigation positioning; the navigation device entering the navigation mode; acquiring a distance between the navigation device and a destination; and displaying the navigation mode of the navigation device based on the distance between the navigation device and the destination.

The present invention further provides a method for displaying a navigation mode of a navigation device comprising: the navigation device performing navigation positioning; the navigation device entering the navigation mode; acquiring a moving speed of the navigation device; acquiring a distance between the navigation device and a destination; and displaying the navigation mode of the navigation device based on the moving speed of the navigation device and the distance between the navigation device and the destination.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 13 is a diagram illustrating a display image of a normal driving speed mode.

DETAILED DESCRIPTION

Figure 1:
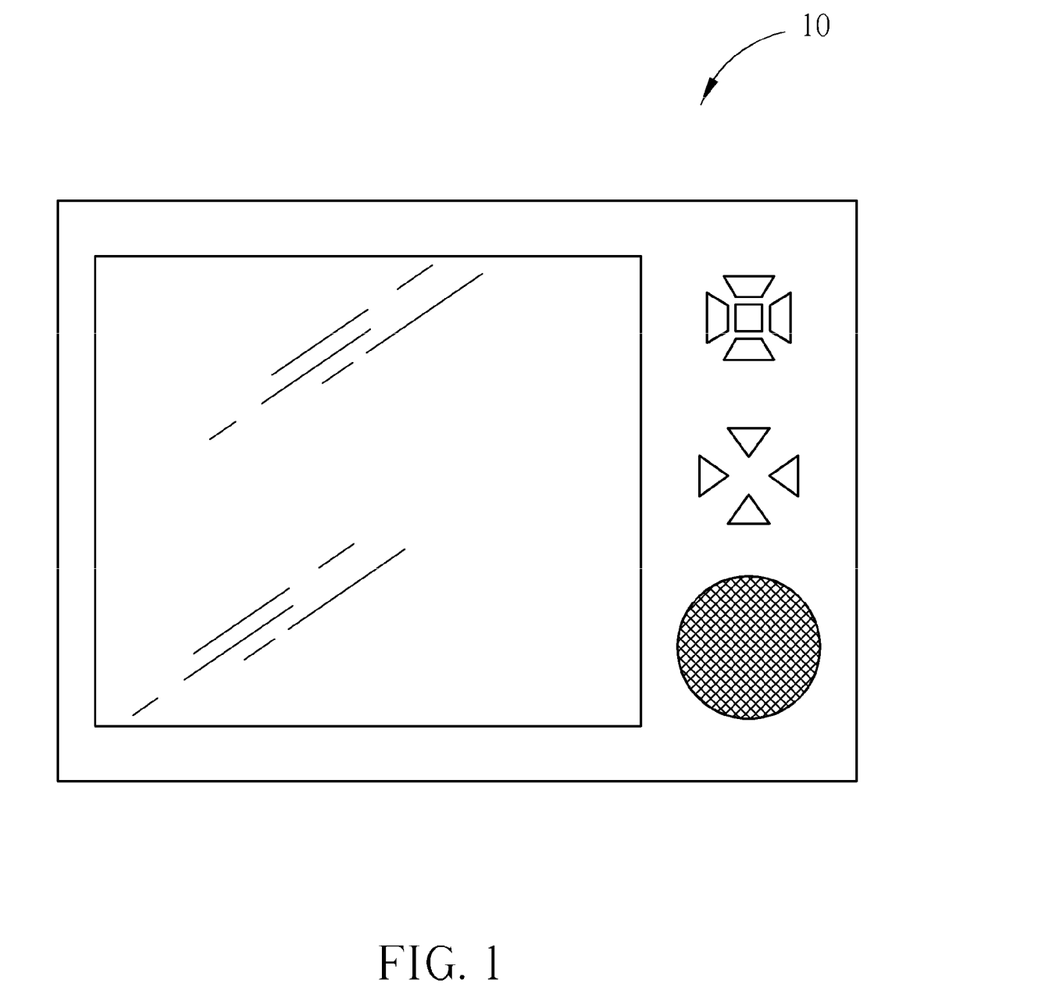
FIG. 1 is a diagram illustrating a navigation device according to the present invention.

Reference is made to FIG. 1 for a diagram illustrating a navigation device 10 according to the present invention. The navigation device 10 is capable of displaying maps and receiving data via an external or a built-in receiver. After computing the received data, the computed data is compared to and associated with the maps, coordinates and data stored in the memory of the navigation device 10. Therefore, the navigation device 10 can acquire its current position, also known as navigation positioning. After completing navigation positioning, the navigation device 10 records the change in position within each predetermined period, and acquires the speed during the predetermined period based on the position change. The navigation device 10 further includes a user interface which allows the user to input commands for map inquiries. When the user enters commands and sets the destination, the navigation device 10 enters a navigation mode, in which various objects, symbols, signs and voice hints are provided for assisting the user in reaching the destination.

Figure 2:
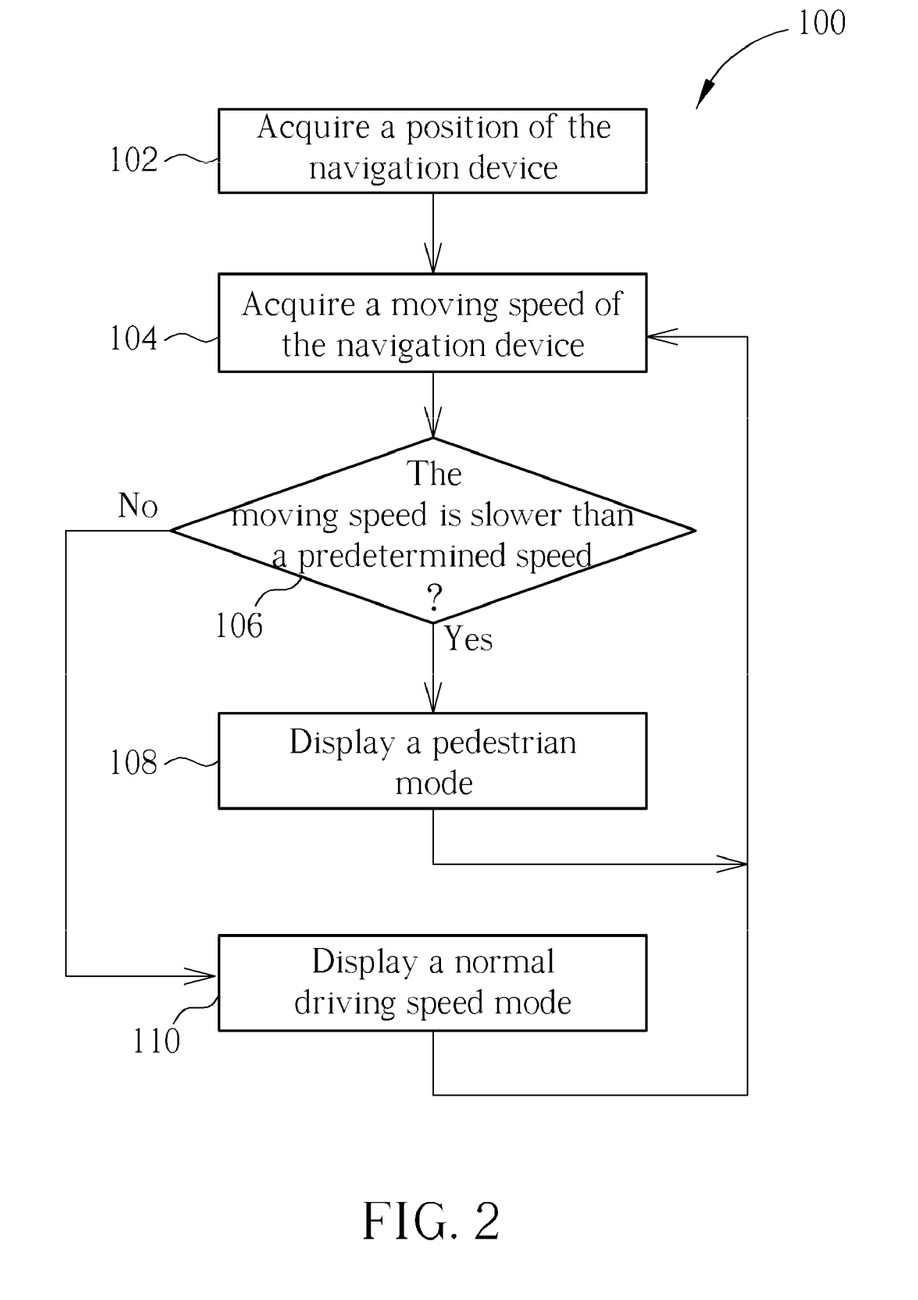
FIGS. 2-11 are flowcharts illustrating methods for operating the navigation device according to the present invention.

Reference is made to FIG. 2 for a flowchart illustrating a first method 100 for operating the navigation device 10. The first method 100 includes the following steps:

Step 102: acquire a position of the navigation device 10;

Step 104: acquire a moving speed of the navigation device 10;

Step 106: determine if the moving speed of the navigation device 10 is slower than a predetermined speed; if the moving speed of the navigation device 10 is slower than the predetermined speed, execute step 108; if the moving speed of the navigation device 10 is not slower than the predetermined speed, execute step 110;

Step 108: display a pedestrian mode; execute step 104; and

Step 110: display a normal driving speed mode; execute step 104.

In the first method 100 for operating the navigation device 10, the navigation device 10 displays a corresponding mode based on its moving speed, regardless of whether the navigation device 10 enters a navigation mode or not. Therefore, the user is not required to manually switch between different modes of the navigation device 10.

Figure 3:
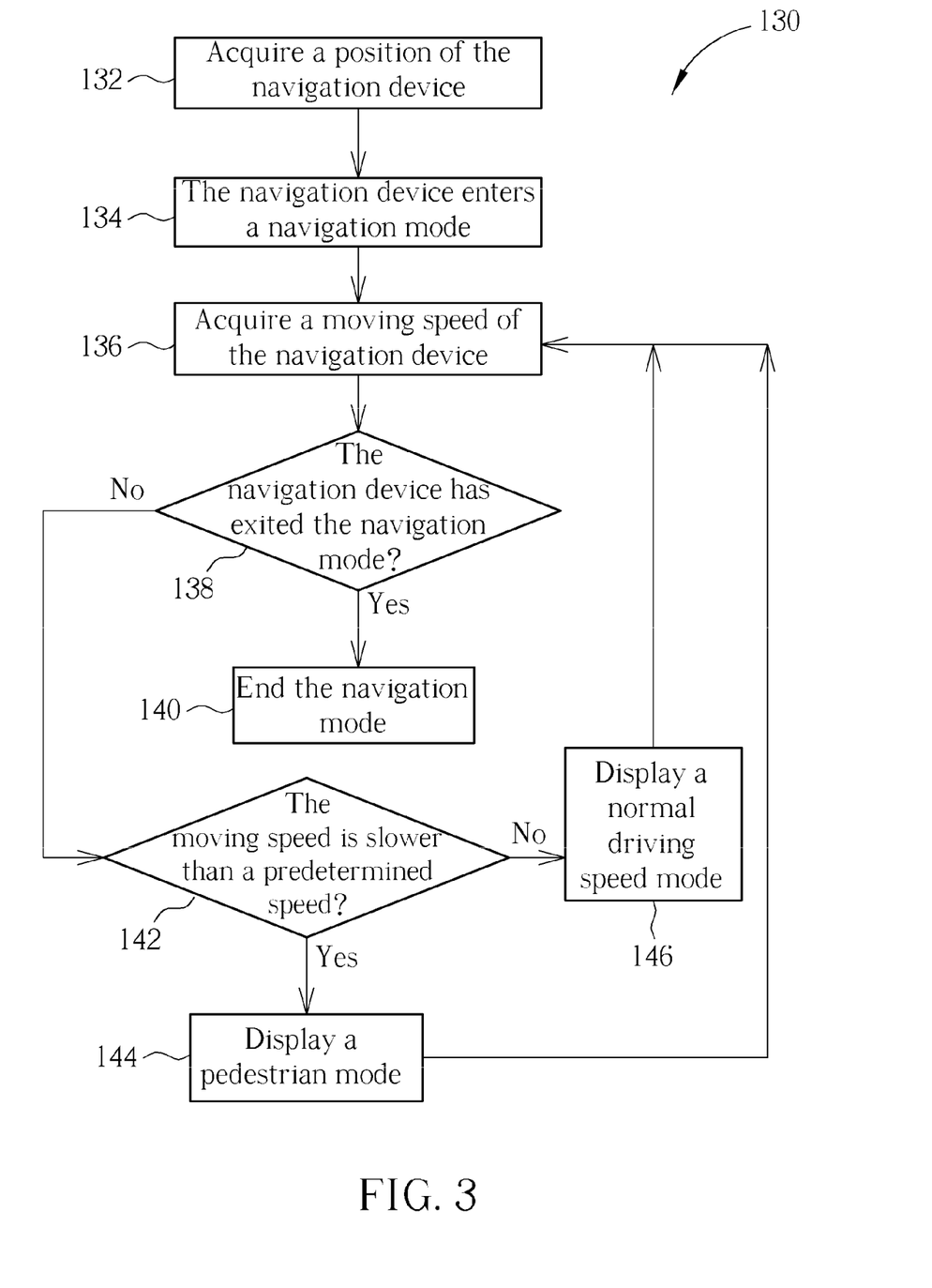

Reference is made to FIG. 3 for a flowchart illustrating a second method 130 for operating the navigation device 10. The second method 130 includes the following steps:

Step 132: acquire a position of the navigation device 10;

Step 134: the navigation device 10 enters a navigation mode;

Step 136: acquire a moving speed of the navigation device 10;

Step 138: determine whether the navigation device 10 has exited the navigation mode; if the navigation device 10 has exited the navigation mode, execute step 140; if the navigation device 10 is still in the navigation mode, execute step 142;

Step 140: end the navigation mode;

Step 142: determine if the moving speed of the navigation device 10 is slower than a predetermined speed; if the moving speed of the navigation device 10 is slower than the predetermined speed, execute step 144; if the moving speed of the navigation device 10 is not slower than the predetermined speed, execute step 146;

Step 144: display a pedestrian mode; execute step 136; and

Step 146: display a normal driving speed mode; execute step 136.

In the second method 130 for operating the navigation device 10, the steps can be executed in a different sequence. For example, step 136 can be executed before step 134. In this case, the navigation device 10 acquires its moving speed and then enters a corresponding mode. Or, step 138 can be executed after each of the steps 132, 134, 136, 142, 144 and 146. In other words, step 138 can be executed anytime as long as the navigation device 10 is in a navigation mode.

Figure 4:
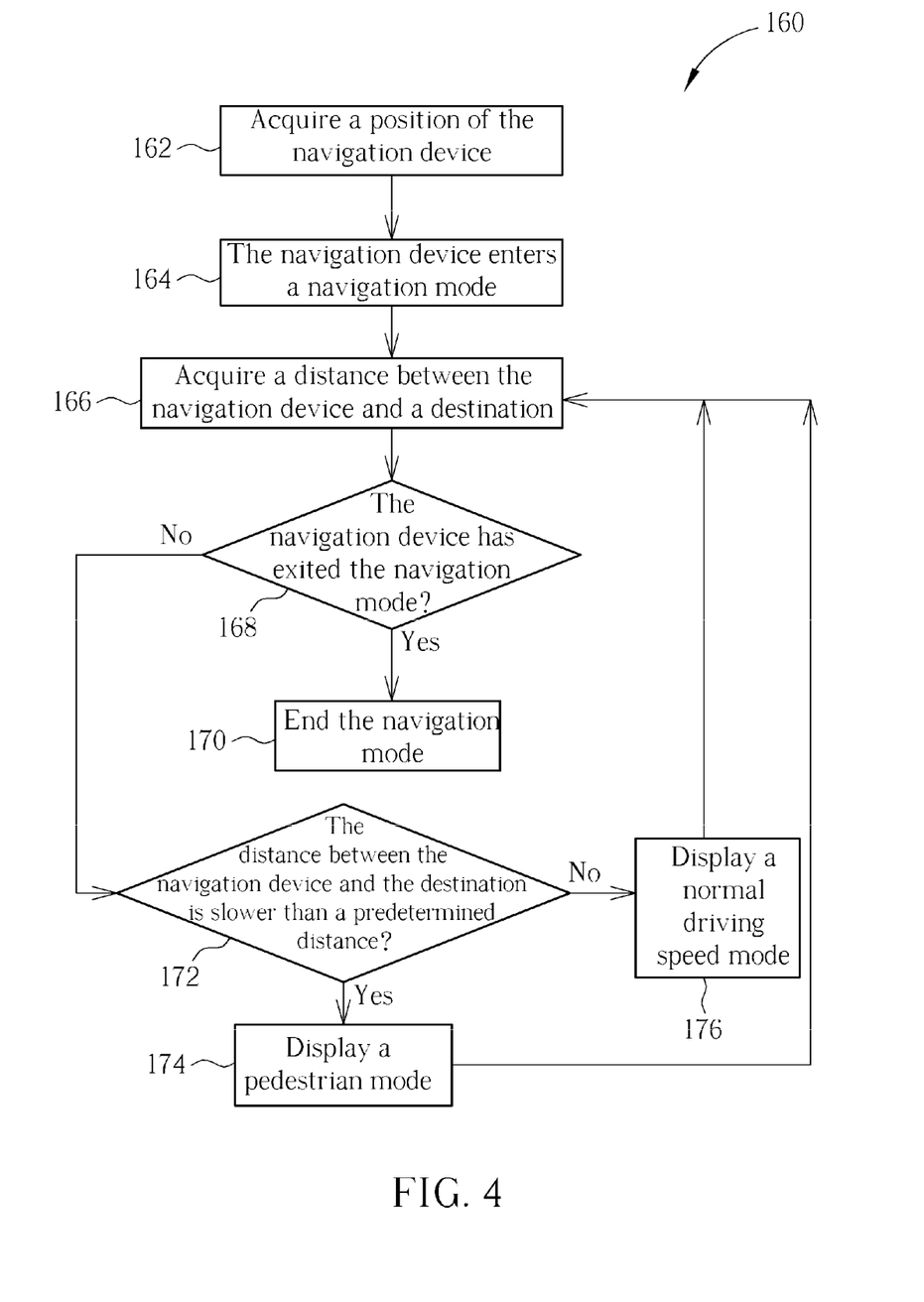

Reference is made to FIG. 4 for a flowchart illustrating a third method 160 for operating the navigation device 10. The third method 160 includes the following steps:

Step 162: acquire a position of the navigation device 10;

Step 164: the navigation device 10 enters a navigation mode;

Step 166: acquire a distance between the navigation device 10 and a destination;

Step 168: determine whether the navigation device 10 has exited the navigation mode; if the navigation device 10 has exited the navigation mode, execute step 170; if the navigation device 10 is still in the navigation mode, execute step 172;

Step 170: end the navigation mode;

Step 172: determine if the distance between the navigation device 10 and the destination is slower than a predetermined distance; if the distance between the navigation device 10 and the destination is smaller than the predetermined distance, execute step 174; if the distance between the navigation device 10 and the destination is not smaller than a predetermined distance, execute step 176;

Step 174: display a pedestrian mode; execute step 166; and

Step 176: display a normal driving speed mode; execute step 166.

In the third method 160 for operating the navigation device 10, the steps can be executed in a different sequence. For example, step 168 can be executed after each of the steps 162, 164, 136, 172, 174 and 176. In other words, step 168 can be executed anytime as long as the navigation device 10 is in a navigation mode.

Figure 5:
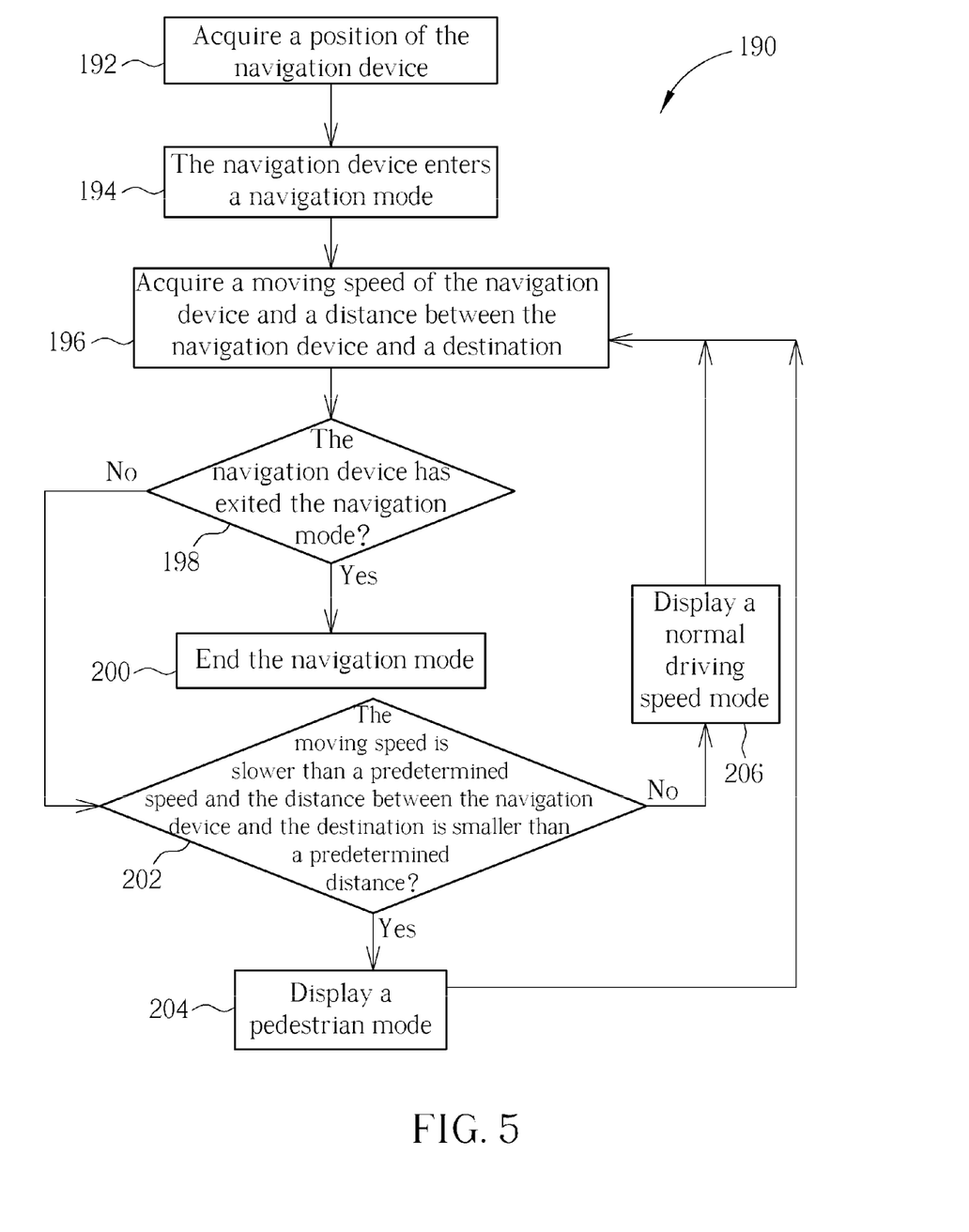

Reference is made to FIG. 5 for a flowchart illustrating a fourth method 190 for operating the navigation device 10. The fourth method 190 includes the following steps:

Step 192: acquire a position of the navigation device 10;

Step 194: the navigation device 10 enters a navigation mode;

Step 196: acquire a moving speed of the navigation device 10 and a distance between the navigation device 10 and a destination;

Step 198: determine whether the navigation device 10 has exited the navigation mode; if the navigation device 10 has exited the navigation mode, execute step 200; if the navigation device 10 is still in the navigation mode, execute step 202;

Step 200: end the navigation mode;

Step 202: determine if the moving speed of the navigation device 10 is slower than a predetermined speed and if the distance between the navigation device 10 and the destination is smaller than a predetermined distance; if yes, execute step 204; otherwise, execute step 206;

Step 204: display a pedestrian mode; execute step 196; and

Step 206: display a normal driving speed mode; execute step 196.

In the fourth method 190 for operating the navigation device 10, the steps can be executed in a different sequence. For example, step 198 can be executed after each of the steps 192, 194, 196, 202, 204 and 206. In other words, step 168 can be executed anytime as long as the navigation device 10 is in a navigation mode.

Figure 6:
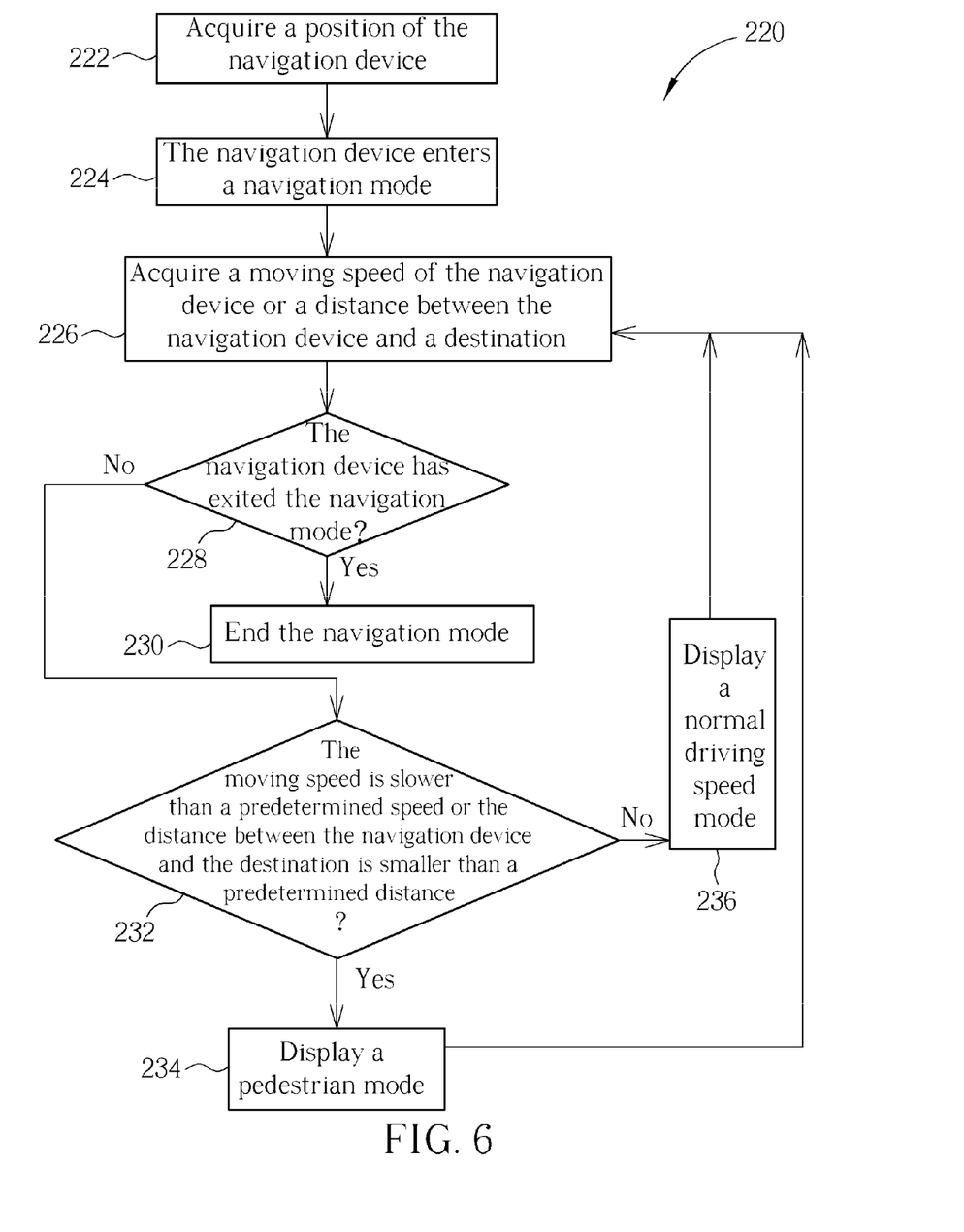

Reference is made to FIG. 6 for a flowchart illustrating a fifth method 220 for operating the navigation device 10. The fifth method 220 includes the following steps:

Step 222: acquire a position of the navigation device 10;

Step 224: the navigation device 10 enters a navigation mode;

Step 226: acquire a moving speed of the navigation device 10 or a distance between the navigation device 10 and a destination;

Step 228: determine whether the navigation device 10 has exited the navigation mode; if the navigation device 10 has exited the navigation mode, execute step 230; if the navigation device 10 is still in the navigation mode, execute step 232;

Step 230: end the navigation mode;

Step 232: if the moving speed of the navigation device 10 and the moving speed of the navigation device 10 is slower than the predetermined speed, or if the distance between the navigation device 10 and the destination and the distance between the navigation device 10 and the destination is smaller than the predetermined distance, execute step 234; otherwise, execute step 236;

Step 234: display a pedestrian mode; execute step 226; and

Step 236: display a normal driving speed mode; execute step 226.

In the fifth method 220 for operating the navigation device 10, the steps can be executed in a different sequence. For example, step 228 can be executed after each of the steps 232, 234, 236, 242, 244 and 246. In other words, step 228 can be executed anytime as long as the navigation device 10 is in a navigation mode. In the fourth method 190, the navigation device 10 displays the pedestrian mode only when the moving speed of the navigation device 10 is slower than a predetermined speed and the distance between the navigation device 10 and the destination is smaller than a predetermined distance. In the fifth method 220, the navigation device 10 displays the pedestrian mode when the moving speed of the navigation device 10 is slower than a predetermined speed or the distance between the navigation device 10 and the destination is smaller than a predetermined distance.

Figure 7:
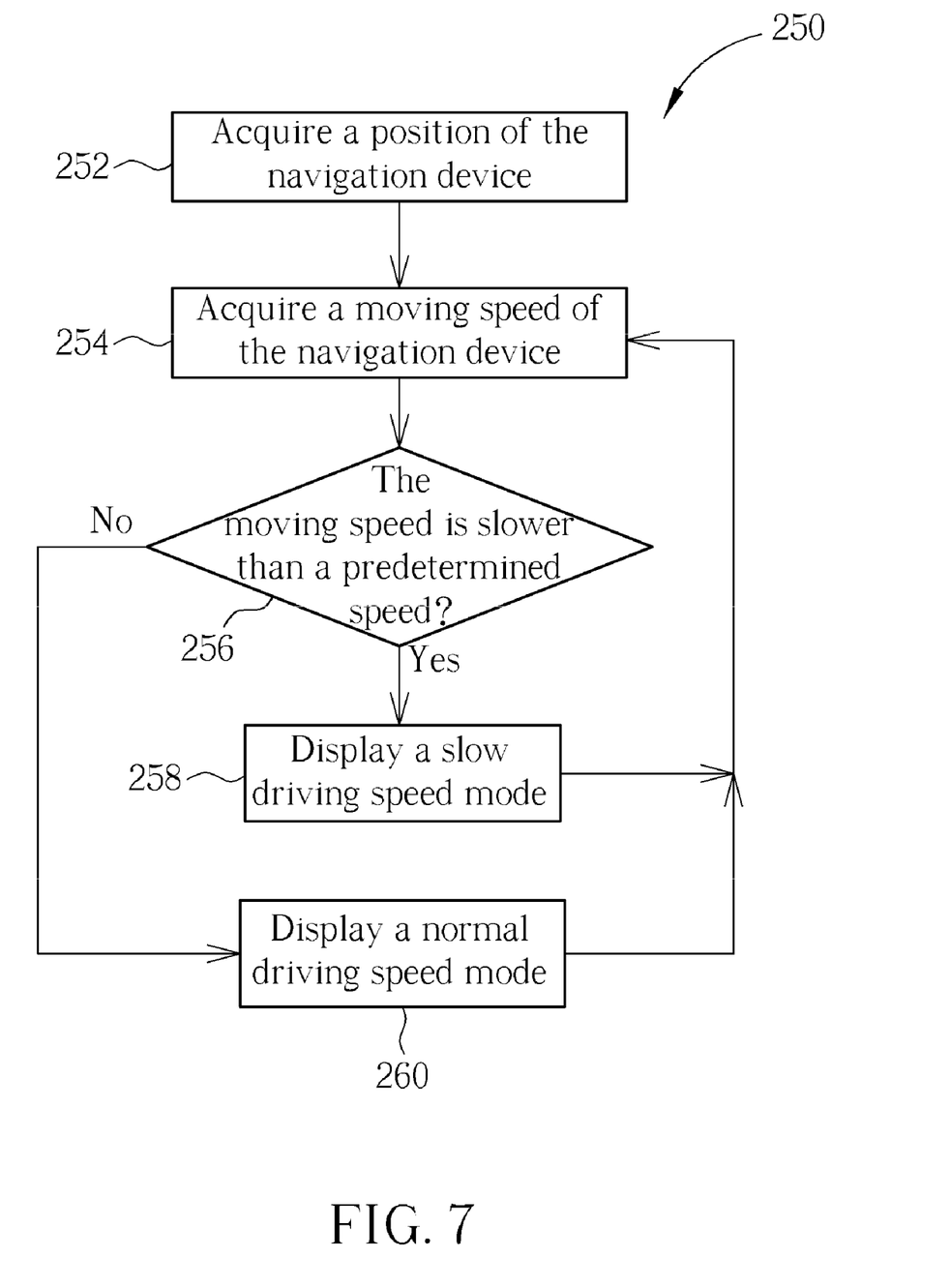

Reference is made to FIG. 7 for a flowchart illustrating a sixth method 250 for operating the navigation device 10. The sixth method 250 includes the following steps:

Step 252: acquire a position of the navigation device 10;

Step 254: acquire a moving speed of the navigation device 10;

Step 256: determine if the moving speed of the navigation device 10 is slower than a predetermined speed; if the moving speed of the navigation device 10 is slower than the predetermined speed, execute step 258; if the moving speed of the navigation device 10 is not slower than the predetermined speed, execute step 260;

Step 258: display a slow driving speed mode; execute step 254; and

Step 260: display a normal driving speed mode; execute step 260.

In the sixth method 250 for operating the navigation device 10, the navigation device 10 displays a corresponding mode based on its moving speed, regardless of whether the navigation device 10 enters a navigation mode or not. Therefore, the user is not required to manually switch between different modes of the navigation device 10.

Figure 8:
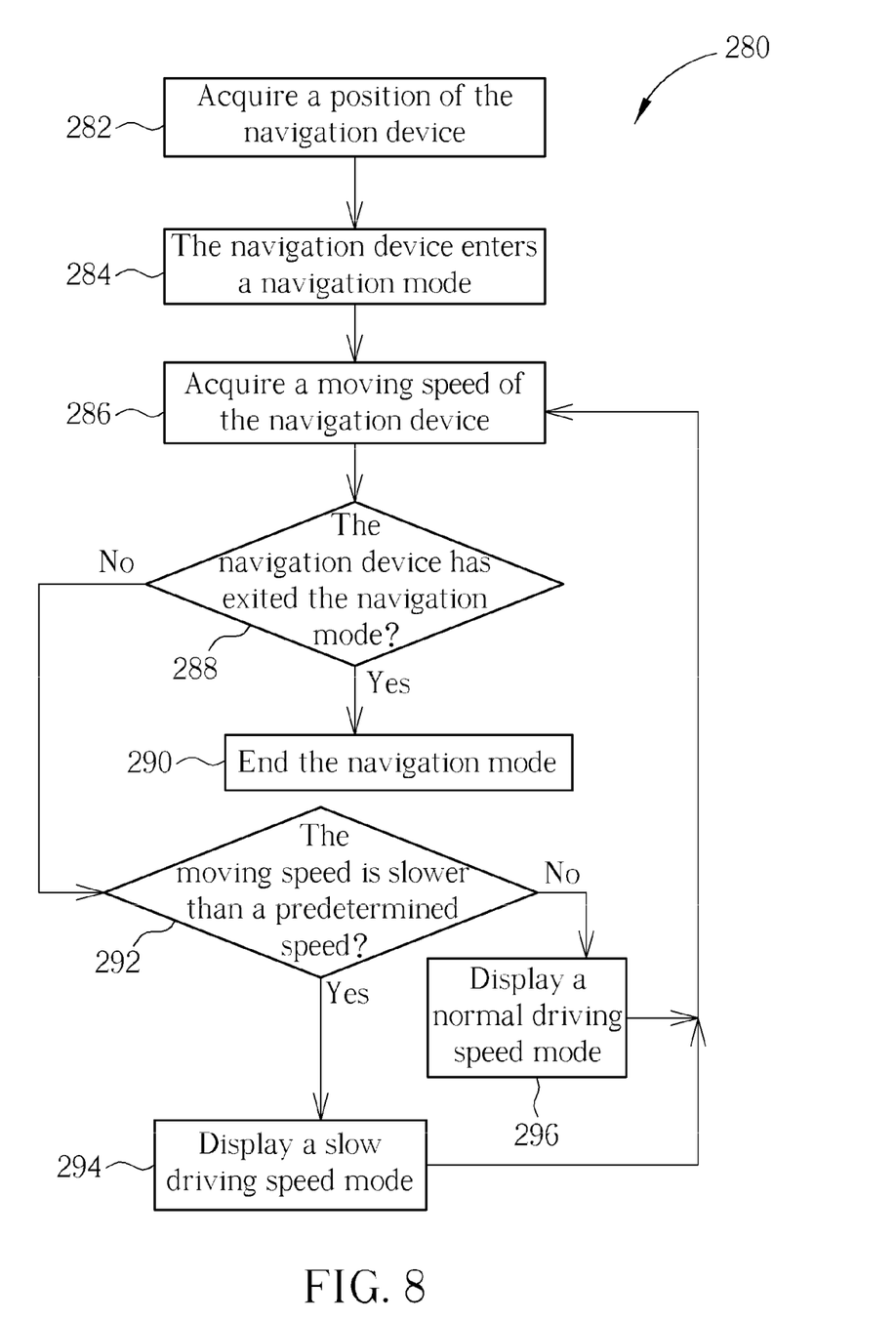

Reference is made to FIG. 8 for a flowchart illustrating a seventh method 280 for operating the navigation device 10. The seventh method 280 includes the following steps:

Step 282: acquire a position of the navigation device 10;

Step 284: the navigation device 10 enters a navigation mode;

Step 286: acquire a moving speed of the navigation device 10;

Step 288: determine whether the navigation device 10 has exited the navigation mode; if the navigation device 10 has exited the navigation mode, execute step 290; if the navigation device 10 is still in the navigation mode, execute step 292;

Step 290: end the navigation mode;

Step 292: determine if the moving speed of the navigation device 10 is slower than a predetermined speed; if the moving speed of the navigation device 10 is slower than the predetermined speed, execute step 294; if the moving speed of the navigation device 10 is not slower than the predetermined speed, execute step 296;

Step 294: display a slow driving speed mode; execute step 286; and

Step 296: display a normal driving speed mode; execute step 286.

In the seventh method 280 for operating the navigation device 10, the steps can be executed in a different sequence. For example, step 286 can be executed before step 284. In this case, the navigation device 10 acquires its moving speed and then enters a corresponding mode. Or, step 288 can be executed after each of the steps 282, 284, 286, 292, 294 and 296. In other words, step 288 can be executed anytime as long as the navigation device 10 is in a navigation mode.

Figure 9:
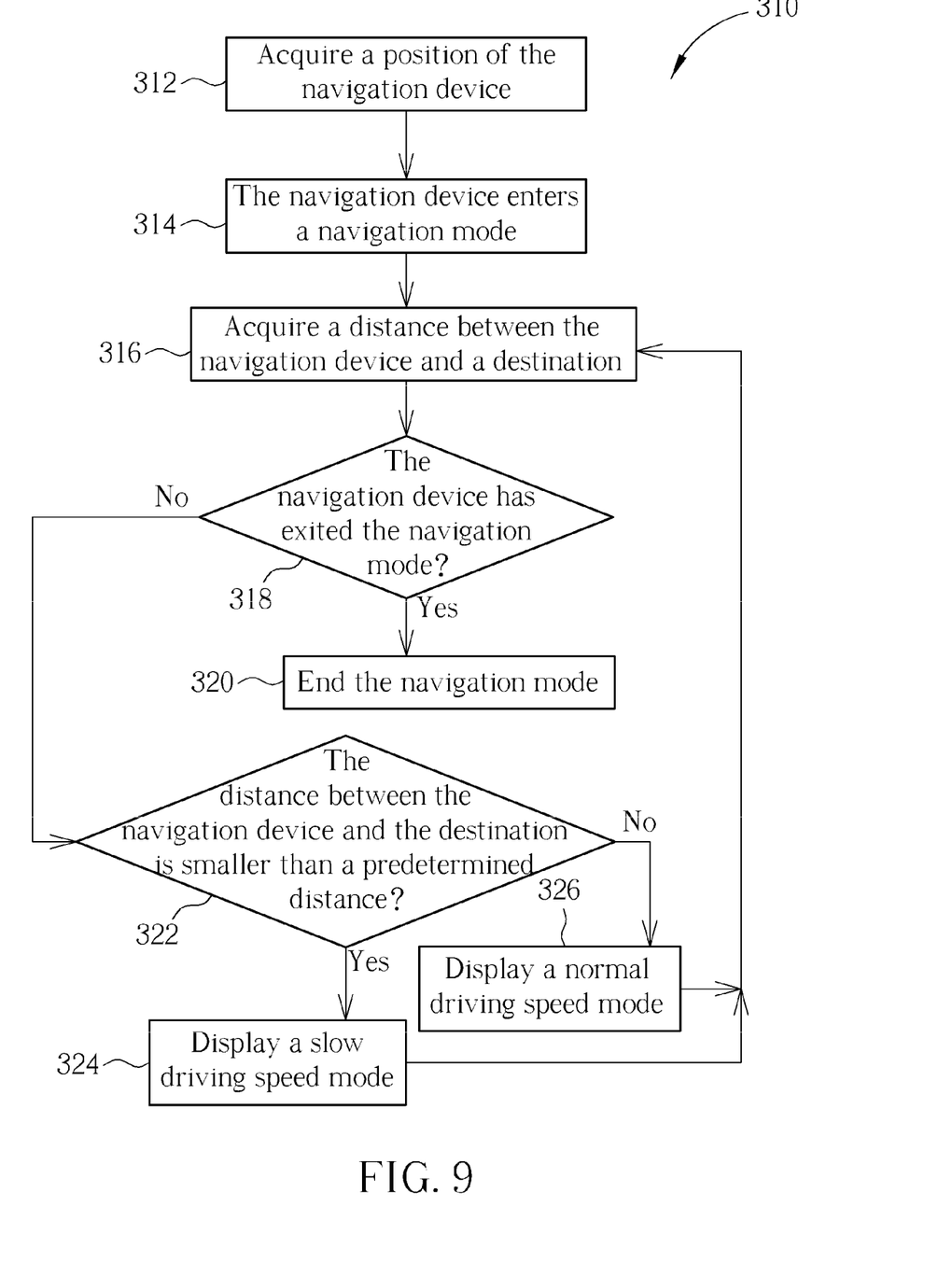

Reference is made to FIG. 9 for a flowchart illustrating an eighth method 310 for operating the navigation device 10. The eighth method 310 includes the following steps:

Step 312: acquire a position of the navigation device 10;

Step 314: the navigation device 10 enters a navigation mode;

Step 316: acquire a distance between the navigation device 10 and a destination;

Step 318: determine whether the navigation device 10 has exited the navigation mode; if the navigation device 10 has exited the navigation mode, execute step 320; if the navigation device 10 is still in the navigation mode, execute step 322;

Step 320: end the navigation mode;

Step 322: determine if the distance between the navigation device 10 and the destination is smaller than a predetermined distance; if the distance between the navigation device 10 and the destination is smaller than the predetermined distance, execute step 324; if the distance between the navigation device 10 and the destination is not smaller than a predetermined distance, execute step 326;

Step 324: display a slow driving speed mode; execute step 316; and

Step 326: display a normal driving speed mode; execute step 316.

In the eighth method 310 for operating the navigation device 10, the steps can be executed in a different sequence. For example, step 318 can be executed after each of the steps 312, 314, 316, 322, 324 and 326. In other words, step 318 can be executed anytime as long as the navigation device 10 is in a navigation mode.

Figure 10:
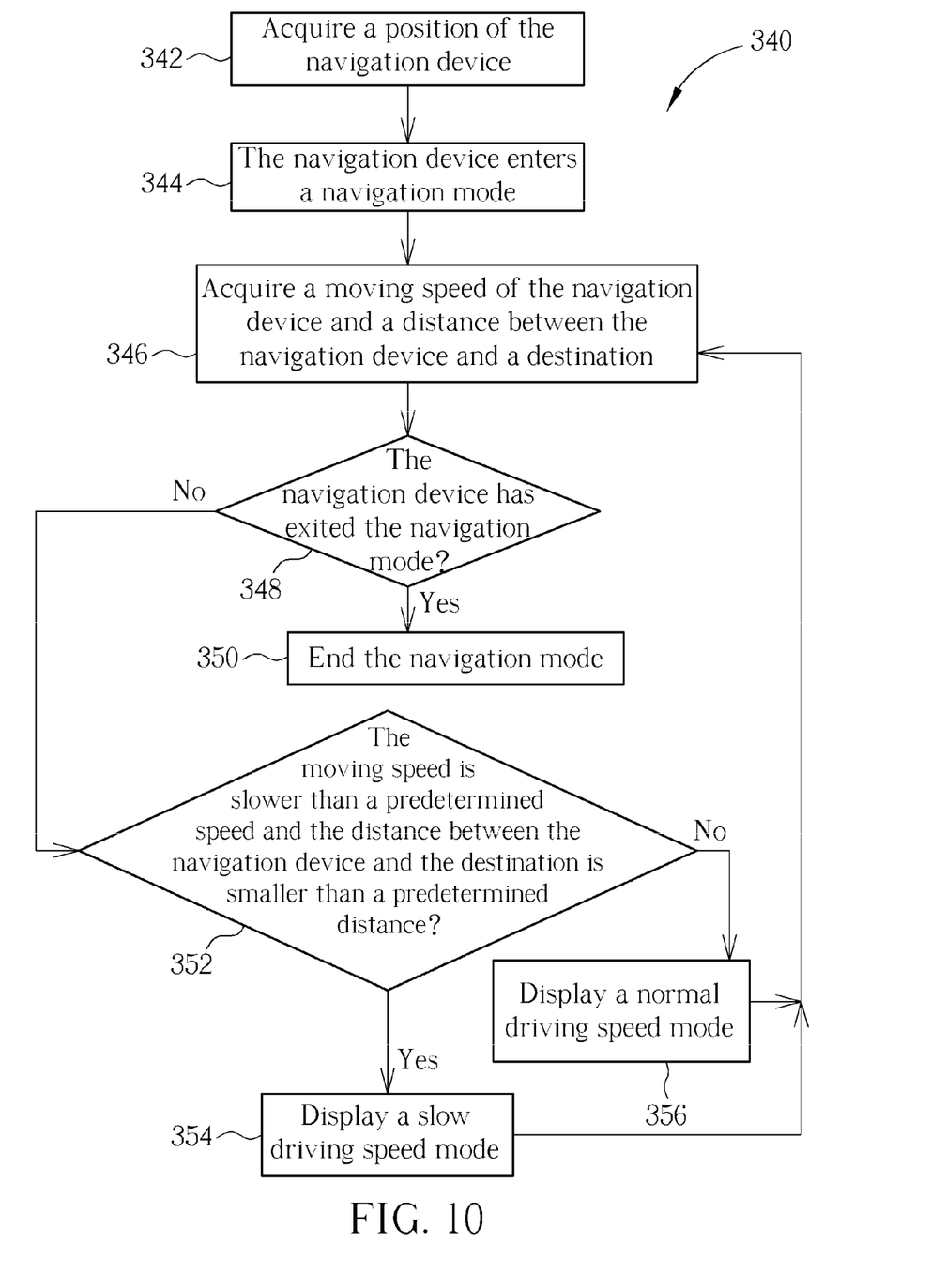

Reference is made to FIG. 10 for a flowchart illustrating a ninth method 340 for operating the navigation device 10. The ninth method 340 includes the following steps:

Step 342: acquire a position of the navigation device 10;

Step 344: the navigation device 10 enters a navigation mode;

Step 346: acquire a moving speed of the navigation device 10 and a distance between the navigation device 10 and a destination;

Step 348: determine whether the navigation device 10 has exited the navigation mode; if the navigation device 10 has exited the navigation mode, execute step 350; if the navigation device 10 is still in the navigation mode, execute step 352;

Step 350: end the navigation mode;

Step 352: determine if the moving speed of the navigation device 10 is slower than a predetermined speed and if the distance between the navigation device 10 and the destination is smaller than a predetermined distance; if yes, execute step 354; otherwise, execute step 356;

Step 354: display a slow driving speed mode; execute step 346; and

Step 356: display a normal driving speed mode; execute step 346.

In the ninth method 340 for operating the navigation device 10, the steps can be executed in a different sequence. For example, step 348 can be executed after each of the steps 342, 344, 346, 352, 354 and 356. In other words, step 348 can be executed anytime as long as the navigation device 10 is in a navigation mode.

Figure 11:
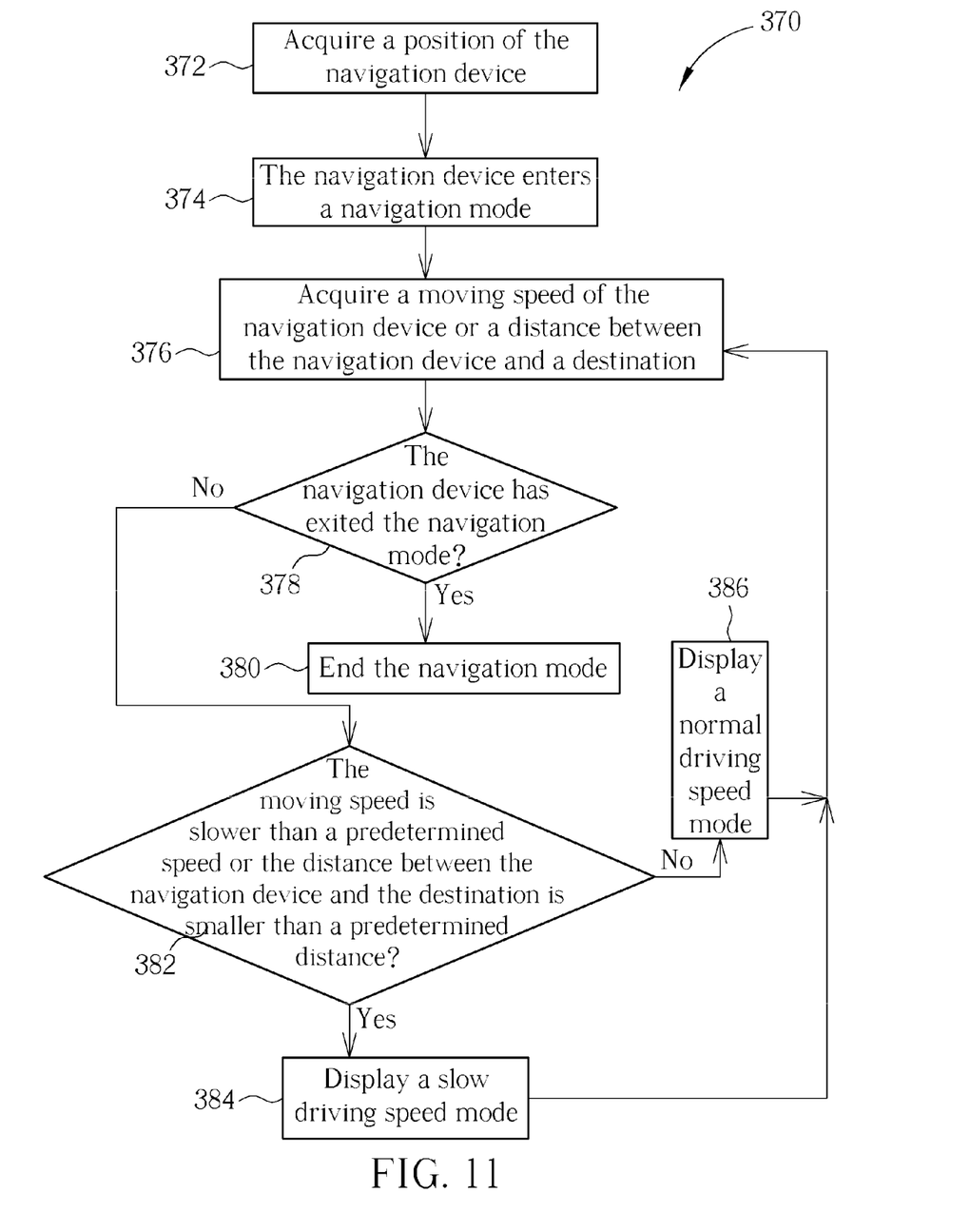

Reference is made to FIG. 11 for a flowchart illustrating a tenth method 370 for operating the navigation device 10. The tenth method 370 includes the following steps:

Step 372: acquire a position of the navigation device 10;

Step 374: the navigation device 10 enters a navigation mode;

Step 376: acquire a moving speed of the navigation device 10 or a distance between the navigation device 10 and a destination;

Step 378: determine whether the navigation device 10 has exited the navigation mode; if the navigation device 10 has exited the navigation mode, execute step 380; if the navigation device 10 is still in the navigation mode, execute step 382;

Step 380: end the navigation mode;

Step 382: if the moving speed of the navigation device 10 and the moving speed of the navigation device 10 is slower than the predetermined speed, or if the distance between the navigation device 10 and the destination and the distance between the navigation device 10 and the destination is smaller than the predetermined distance, execute step 384; otherwise, execute step 386;

Step 384: display a slow driving speed mode; execute step 376; and

Step 386: display a normal driving speed mode; execute step 376.

In the tenth method 370 for operating the navigation device 10, the steps can be executed in a different sequence. For example, step 378 can be executed after each of the steps 372, 374, 376, 382, 384 and 386. In other words, step 378 can be executed anytime as long as the navigation device 10 is in a navigation mode. In the ninth method 370, the navigation device 10 displays the slow driving speed only when the moving speed of the navigation device 10 is slower than a predetermined speed and the distance between the navigation device 10 and the destination is smaller than a predetermined distance. In the tenth method 370, the navigation device 10 displays the slow driving speed when the moving speed of the navigation device 10 is slower than a predetermined speed or the distance between the navigation device 10 and the destination is smaller than a predetermined distance.

Figure 12:
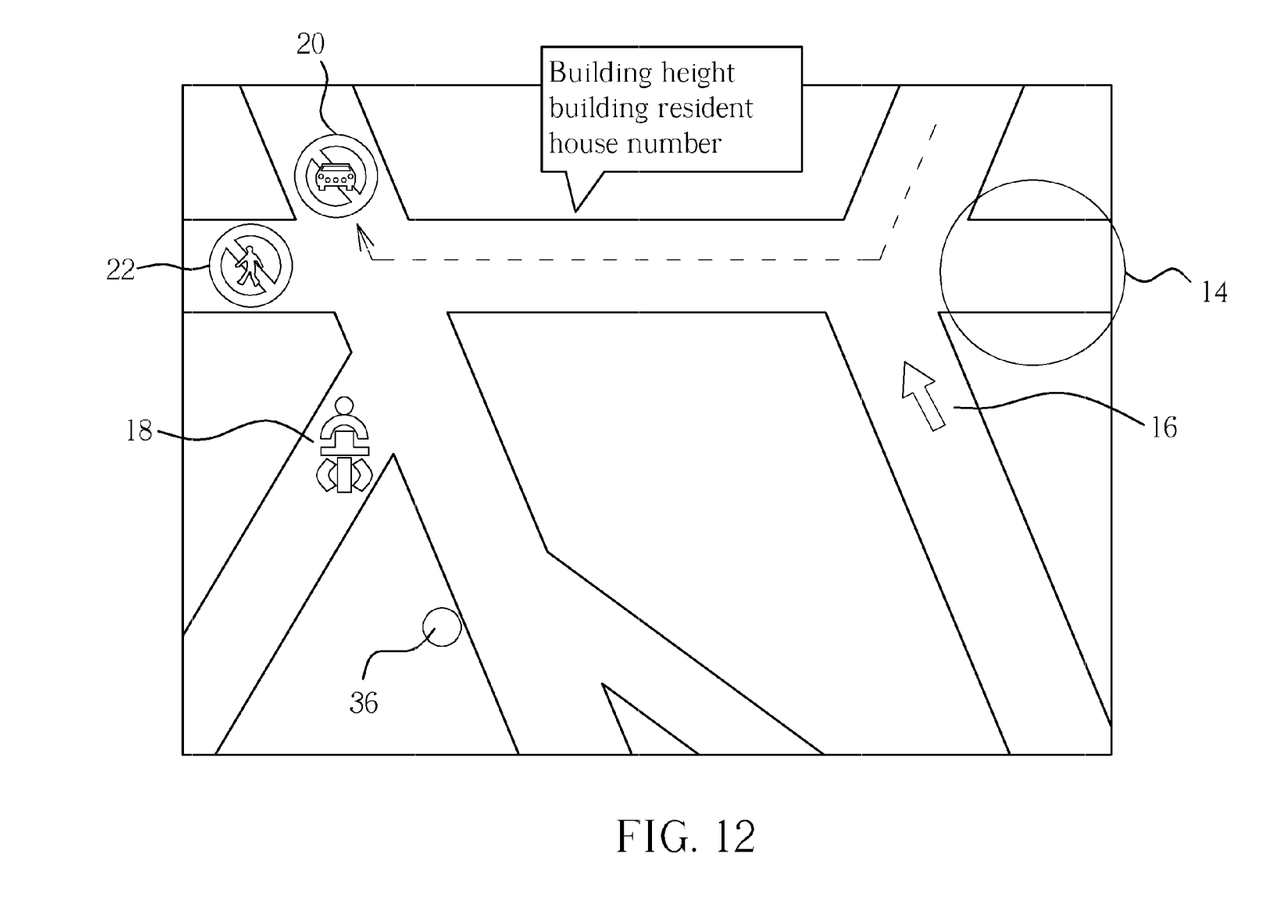
FIG. 12 is a diagram illustrating a display image of a pedestrian mode.

Reference is made to FIG. 12 for a diagram illustrating a display image of a pedestrian mode. The display image includes a path 14 passing through a park, a one-way street 16, a motorcycle-only street 18, a car-forbidden street 20 or a passenger-forbidden traffic sign 22, the names of all the streets displayed on the navigation device 10, the height of each building around the navigation device 10, the resident or the owner of each unit in each building around the navigation device 10, the house number or the house number range of each unit in each building around the navigation device 10, a location 36 for taking public transportation. The display image of the navigation device 10 can be enlarged and the number of objects shown in the display image can be increased.

Figure 13:
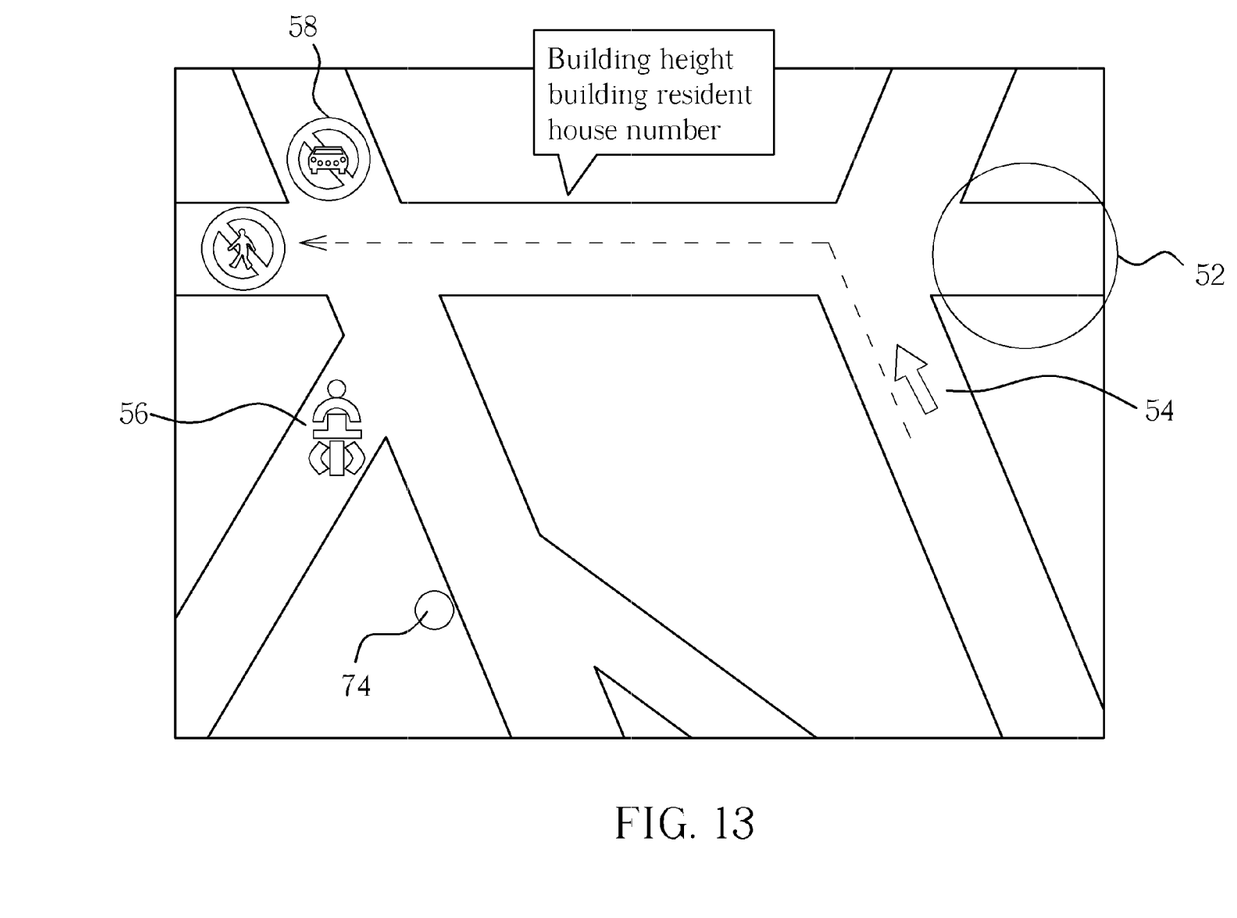
FIG. 13 is a diagram illustrating a display image of a slow driving speed mode.

Reference is made to FIG. 13 for a diagram illustrating a display image of a slow driving speed mode. The display image includes a path 52 passing through a park, a one-way street 54, a motorcycle-only street 56, a car-forbidden street 58 or a passenger-forbidden traffic sign 58, the names of all the streets displayed on the navigation device 10, the height of each building around the navigation device 10, the resident or the owner of each unit in each building around the navigation device 10, the house number or the house number range of each unit in each building around the navigation device 10, and a location 74 for taking public transportation. The display image of the navigation device 10 can be enlarged and the number of objects shown in the display image can be increased.

Figure 14:
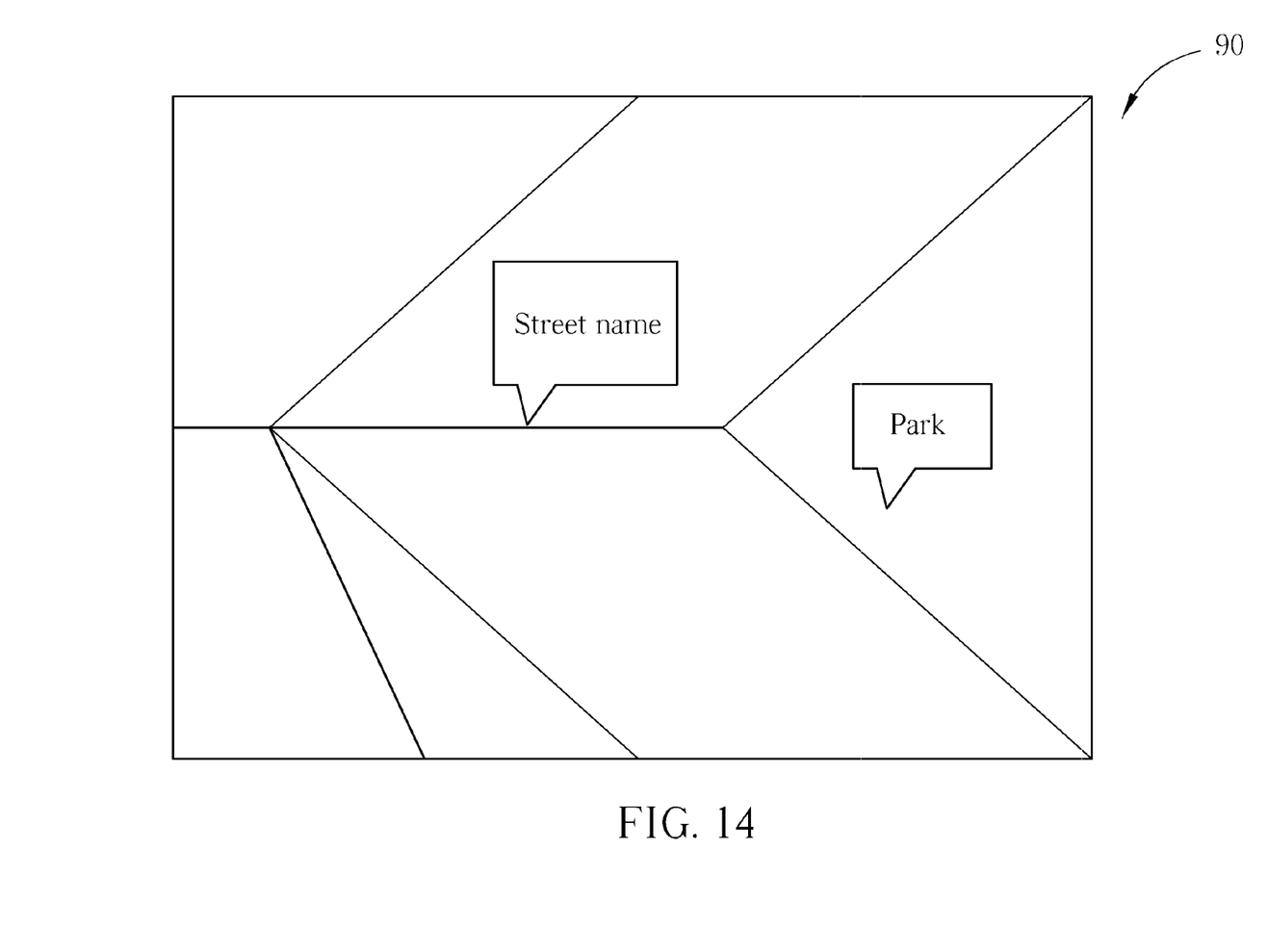
FIG. 14 is a diagram illustrating a display image of a normal driving speed mode.

Reference is made to FIG. 14 for a diagram illustrating a display image of a normal driving speed mode. In the normal driving speed mode, the navigation device 10 displays a small scale map showing fewer objects, as can be seen in FIG. 14. Unlike the large scale maps shown in the pedestrian mode or the slow driving speed mode, the small scale map in the normal driving speed mode cannot instruct the user to reach a precise target.

The present invention can automatically switch between display modes of a navigation device according to the moving speed of the navigation device and the distance between the navigation device and the destination. In contrast to the prior art method in which the user is required to manually adjust the display scale of the navigation device in order to search for an object not depicted in the small scale map or to locate the destination more precisely, the present invention provides a more convenient and safer way for operating the navigation device Those skilled in the art will readily observe that numerous modifications and alterations of the device and method may be made while retaining the teachings of the invention.

What is claimed is:

1. A method for displaying a navigation mode of a navigation device comprising:

performing navigation positioning using the navigation device;

entering the navigation mode using the navigation device;

acquiring a moving speed of the navigation device;

acquiring a distance between the navigation device and a destination; and displaying the navigation mode of the navigation device based on the moving speed of the navigation device and the distance between the navigation device and the destination, comprising:

displaying a pedestrian mode of the navigation mode when the moving speed of the navigation device is slower than a predetermined speed and when the distance between the navigation device and the destination is smaller than a predetermined distance, wherein displaying the pedestrian mode includes displaying names of all the streets displayed on the navigation device, and displaying the pedestrian mode includes enlarging objects displayed on the navigation device or increasing the amount of objects displayed in a predetermined range; and displaying a normal driving mode of the navigation mode when the moving speed of the navigation device is greater than the predetermined speed and when the distance between the navigation device and the destination is greater than the predetermined distance.

* * * * *